US008612063B2

(12) United States Patent
Lau et al.

(10) Patent No.: US 8,612,063 B2
(45) Date of Patent: Dec. 17, 2013

(54) TEMPERATURE CONTROL SETPOINT OFFSET FOR RAM AIR MINIMIZATION

(75) Inventors: Andrea Chor Ying Lau, Scarborough (CA); Xiaomei Li, Mississauga (CA)

(73) Assignee: Honeywell International, Inc., Morristown, NJ (US)

( * ) Notice: Subject to any disclaimer, the term of this patent is extended or adjusted under 35 U.S.C. 154(b) by 378 days.

(21) Appl. No.: 13/099,096

(22) Filed: May 2, 2011

(65) Prior Publication Data
US 2012/0279698 A1 Nov. 8, 2012

(51) Int. Cl.
G05D 23/00 (2006.01)

(52) U.S. Cl.
USPC ........... 700/299; 700/279; 700/280; 700/283; 700/297; 700/276; 700/278; 700/286; 700/300; 60/286; 165/287; 165/280; 165/283; 165/297; 137/13; 137/209; 141/66; 62/87; 62/86; 62/402; 62/172; 62/401

(58) Field of Classification Search
USPC .......... 700/279, 299, 300, 276, 278; 165/287, 165/280, 283, 297; 60/286
See application file for complete search history.

(56) References Cited

U.S. PATENT DOCUMENTS

| | | | |
|---|---|---|---|
| 3,045,983 A | | 7/1962 | Best |
| 4,263,786 A | | 4/1981 | Eng |
| 5,335,708 A | * | 8/1994 | Murakami et al. ............ 165/297 |
| 5,675,080 A | * | 10/1997 | Wada ........................ 73/114.74 |
| 7,036,319 B2 | * | 5/2006 | Saunders et al. ................ 60/782 |
| 7,152,635 B2 | | 12/2006 | Moravec et al. |
| 7,171,819 B2 | * | 2/2007 | Lui et al. ......................... 62/172 |
| 7,856,824 B2 | * | 12/2010 | Anderson et al. ............... 60/728 |
| 8,397,487 B2 | * | 3/2013 | Sennoun et al. ............... 60/266 |
| 2004/0065383 A1 | * | 4/2004 | Jones et al. ..................... 141/66 |
| 2007/0267060 A1 | * | 11/2007 | Scherer et al. ................. 137/13 |
| 2008/0314564 A1 | * | 12/2008 | Nagaseki et al. ........ 165/104.31 |
| 2010/0076611 A1 | * | 3/2010 | Cowans et al. ............... 700/285 |
| 2010/0116484 A1 | * | 5/2010 | Kokubo et al. ............... 165/201 |
| 2010/0155046 A1 | * | 6/2010 | Surawski ...................... 165/287 |
| 2012/0210721 A1 | * | 8/2012 | Olivarez et al. ................. 60/772 |

OTHER PUBLICATIONS

Hodal et al, "Bleed Air Temperature Regulation System: Modeling, Control, and Simulation", Aug. 31, 2005, pp. 1003-1008.*
Shang, "Optimal control of a bleed air temperature regulation system", Jan. 1, 2007, pp. 95.*
Lan Shang; Guangjun Liu; Nodal, P.; Dept. of Aerosp. Eng., Ryerson Univ., Toronto, ON, Canada "Development of High Performance Aircraft Bleed Air Temperature Control System with Reduced Ram Air Usage" Source Details: Control Systems Technology, IEEE Transactions on Issue Date: Mar. 2010; vol. 18 Issue:2 ; on pp. 438-445.

* cited by examiner

*Primary Examiner* — Kavita Padmanabhan
*Assistant Examiner* — Olvin Lopez Alvarez
(74) *Attorney, Agent, or Firm* — Shimokaji & Associates, P.C.

(57) ABSTRACT

An environmental control systems (ECS) for an aircraft in which bleed air is cooled with ram air, the ECS may include a ram air controller configured to control a rate of ram air flow responsively to a desired temperature of bleed air at a bleed air outlet and a bleed air controller configured to control a rate of bleed air flow responsively to a temperature lower than the desired temperature of the bleed air at the bleed air outlet. Collectively the two controllers may provide a minimizing of ram air usage for cooling the bleed air.

18 Claims, 4 Drawing Sheets

TEMPERATURE CONTROL SETPOINT OFFSET FOR RAM AIR MINIMIZATION

BACKGROUND OF THE INVENTION

The present invention generally relates to control of temperature of a flow of gas. More particular, the invention relates to control of such temperature in an environmental control system (ECS) of an aircraft.

In conventional aircraft ECS, engine bleed air may be used as an air source. Temperature control of the bleed air entering the ECS may be achieved by passing the bleed air through a heat exchanger that may be cooled by ram air. When ram air is introduced into an aircraft there may be a resultant increase in drag and fuel consumption. It is known that decreasing the amount of introduced ram air may increase aircraft efficiency. However, at low ram flows, accurate control of ECS temperature may be difficult to maintain when variations in bleed air temperature may occur.

As can be seen, there is a need to provide a system for accurately controlling ECS temperature during variations of temperature of bleed air emerging from an engine of an aircraft while minimizing ram air flow.

SUMMARY OF THE INVENTION

In one aspect of the present invention, an environmental control systems (ECS) for an aircraft, in which bleed air is cooled with ram air, may comprise: a ram air controller configured to control a rate of ram air flow responsively to a desired temperature of bleed air at a bleed air outlet; and a bleed air controller configured to control a rate of bleed air flow responsively to a temperature lower than the desired temperature of the bleed air at the bleed air outlet.

In another aspect of the present invention, a temperature regulator for a gas flow may comprise: a heat exchanger; a first flow path for a first gas passing over an exterior of the heat exchanger; a second flow path for a second gas passing through an interior of the heat exchanger; a first controller configured to control a rate of flow of the first gas responsively to a desired temperature of the second gas at an outlet for the second gas; and a second controller configured to control a rate of flow of the second gas responsively to a temperature lower than the desired temperature.

In still another aspect of the invention, a method for regulating temperature of a flow of gas may comprise the steps of: passing a first flow of a first gas through a heat exchanger; cooling the first flow of gas with a second flow of a second gas passing over the heat exchanger; controlling a rate of the second flow of the second gas responsively to a desired output temperature of the first flow of the first gas; and controlling a rate of the first flow of the first gas responsively to an offset temperature lower than the desired output temperature.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provides an ECS temperature control system in which ram air use is minimized through use of a temperature offset control point for bleed air temperature control.

Figure 1:
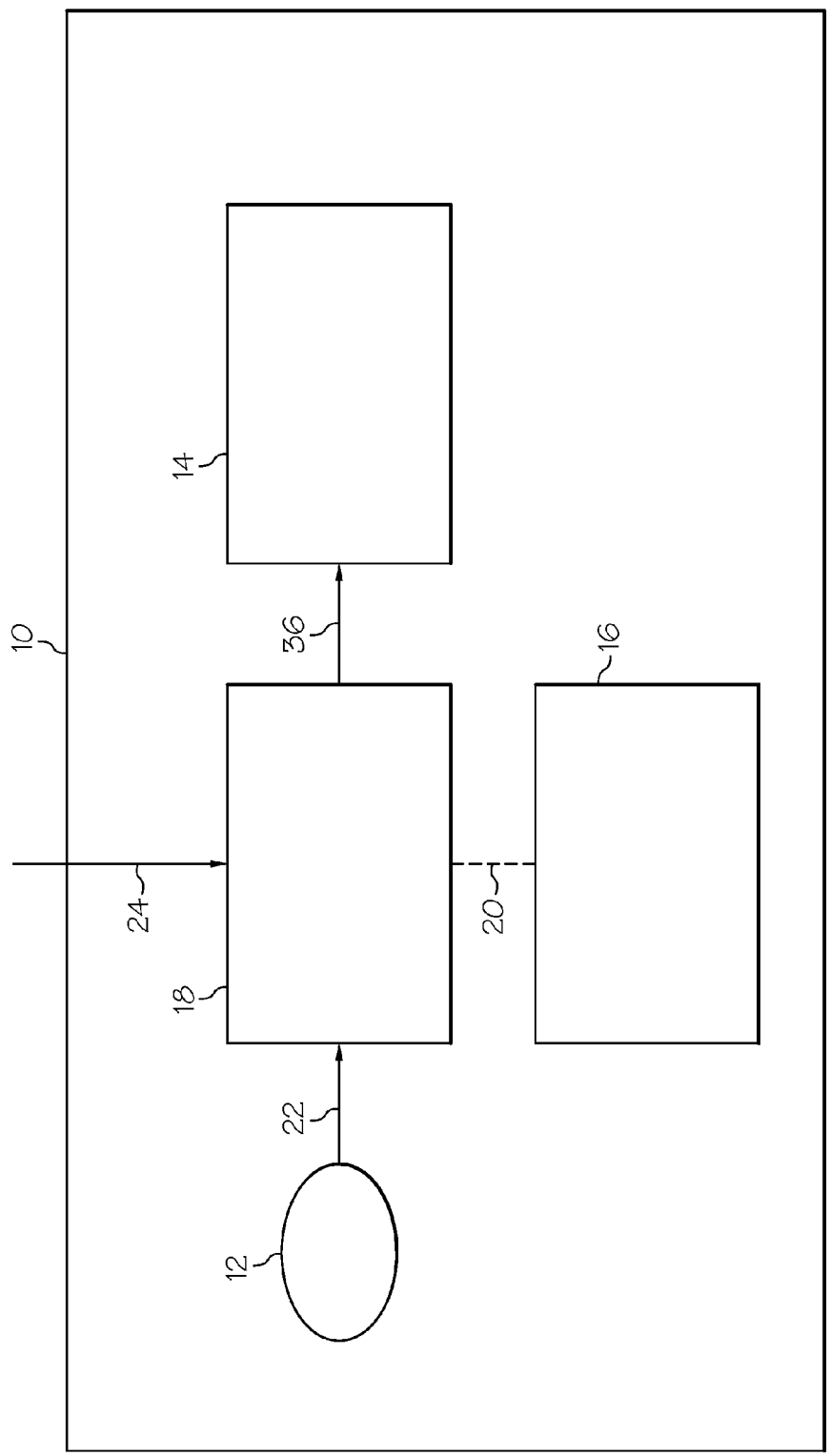
FIG. 1 is a block diagram of an aircraft environmental control system (ECS) in accordance with an embodiment of the invention.

Referring now to FIG. 1, an aircraft 10 may include one or more engines 12, a cabin 14 for passengers and crew, an aircraft control center 16 and an environmental control system (ECS) 18 for controlling air quality and air temperature in the cabin 14. In operation, the ECS 18 may receive a desired temperature signal 20 from the control center 16. The ECS 18 may admit bleed air 22 from the engine 12 and ram air 24 from outside of the aircraft 10 so that output air 26 may be discharged into the cabin 14 at a temperature that corresponds to the desired temperature of the signal 20.

Figure 2:
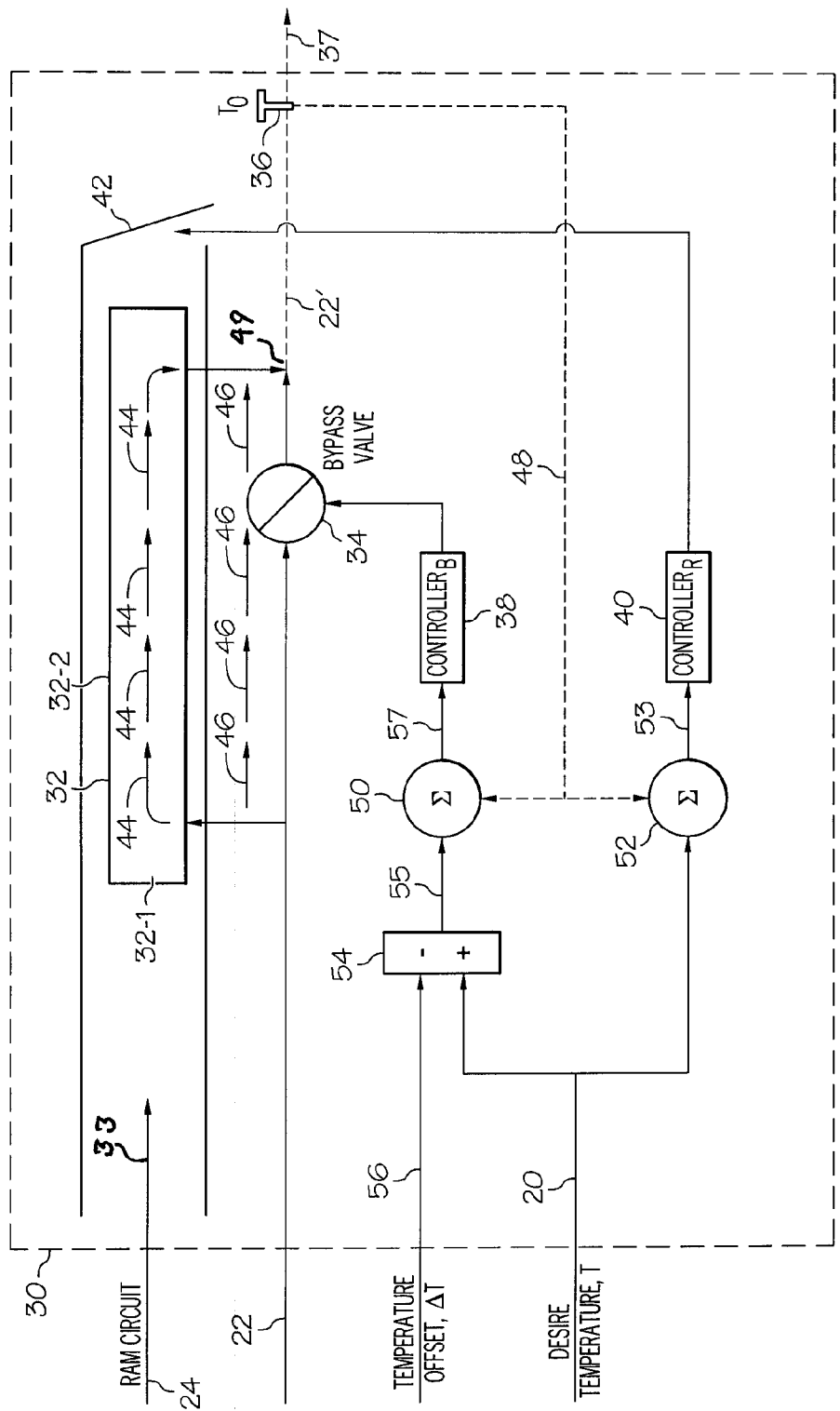
FIG. 2 is a block diagram of a temperature regulator that may be employed in the ECS of FIG. 1 in accordance with an embodiment of the invention.

Referring now to FIG. 2, there is shown a temperature regulator 30 which may be included in the ECS 18. The regulator 30 may include a heat exchanger 32, a bleed-air bypass valve 34, a temperature sensor 36, a bleed-air controller 38, a ram-air controller 40 and a ram-air door 42. In operation, the regulator 30 may employ the ram air controller 40 to determine operational positioning of the ram-air door 42. Operational positioning of the ram-air door 42 may determine how much ram air 24 may be admitted into the aircraft 10. Bleed air 22 may enter the regulator 30 and pass along two possible paths. A first flow path, designated by the arrows 44, may allow a first portion 44 of the bleed air 22 to flow through an interior 32-1 of the heat exchanger 32 positioned in a ram-air flow path 33. A second path, designated by the arrows 46, may allow a second portion 46 of the bleed air 22 to pass directly through the bypass valve 34. The first portion 44 may be cooled as it passes through the heat exchanger 32 because the ram air 24 may pass across an exterior 32-2 of the heat exchanger 32 to provide cooling. The second portion 46 of the bleed air 22 may pass directly to the bypass valve 34 in an uncooled condition. At a mixing point 49, the first portion 44 and the second portion 46 may merge together to become comingled bleed air 22'. Operational positioning of the bypass valve 34 may determine the volume of the bleed air 22' that enters the ECS 18. The temperature sensor 36 may sense the temperature of the comingled bleed air 22' at a bleed air outlet 37.

It can be seen that the comingled bleed air 22' may have a temperature that is a function of two factors, operational positioning of the bypass valve 34 and operational positioning of the ram-air door 42. It may be noted that increasing flow of the ram air 24 may have a corresponding increase in undesirable drag force on the aircraft 10. It may also be noted that at certain operating conditions of the aircraft 10, it may be possible to achieve a desired cabin air quality even if the bypass valve 34 and the ram-air door 42 are closed. While it may appear desirable to keep the ram-air door 44 closed to reduce drag, some undesirable control lagging may result from keeping the ram door 44 and/or the bypass valve 34 completely closed. In the event of a sudden change in temperature of the bleed air 22 coming from the engine 12, there may be a need for a correspondingly sudden change in operational positioning of the bypass valve 34. If the bypass valve 34 changes from a fully closed position to a partially or fully open position, there may be a lack of accurate control of temperature of the bleed air 22' during such a change. In order to avoid such inaccuracies, it may be desirable to operate the ECS 18 at all times with the bypass valve 34 partially open. Similarly, it may be desirable to maintain the ram-air door 42 partially open at all times.

In an exemplary embodiment of the invention, the regulator 30 may be constructed and operated so that the ram-air door 42 and the bypass valve 34 may remain partially open at all times, but the degree to which the ram-air door 42 is open is minimized.

The temperature sensor 36 may provide an output temperature signal 48 to a ram-air comparator 52. The comparator 52 may also be provided with the desired temperature signal 20. The signal 20 may also be applied to an offset summer 54. A temperature offset (referred to in general as ΔT), identified by the numeral 56, and the signal 20 may be applied to the offset summer 54. The comparator 52 may produce an error signal 53. The controller 40 may be operationally connected to the ram-air door 42 and may provide for operational positioning of the ram-air door 42 responsively to the error signal 53.

The temperature sensor 36 may also provide an output temperature signal 48 to a bleed-air comparator 50. The comparator 50 may be provided with an offset temperature signal 55 from the offset summer 54. The comparator 50 may produce an error signal 57. The controller 38 may be operationally connected to the bypass valve 34 and may provide for operational positioning of the bypass valve 34 responsively to the error signal 57.

Figure 3:
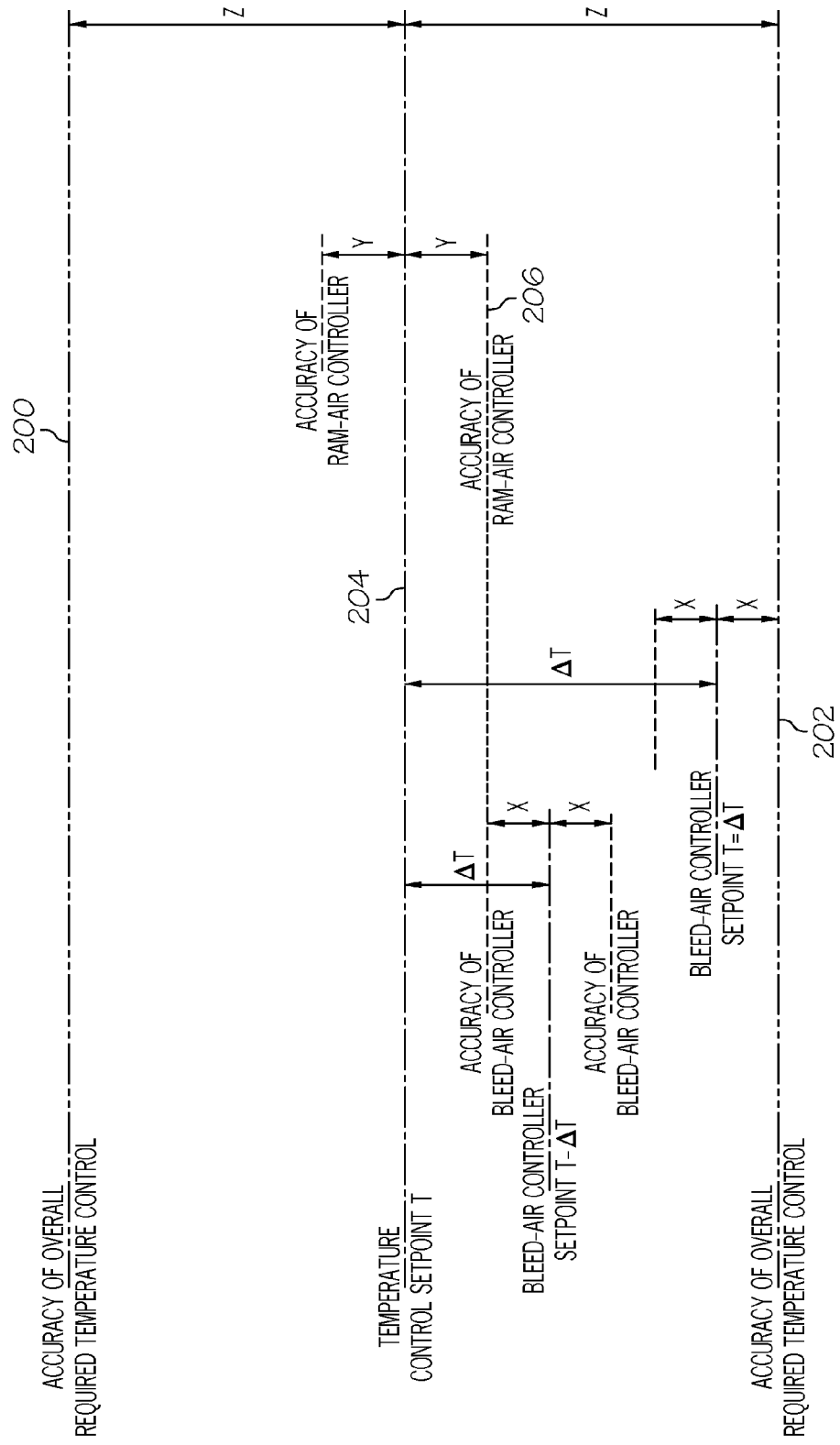
FIG. 3 is a graphical representation of a relationship between an offset temperature and various parameters of the control system of FIG. 1.

Referring now to FIG. 3, it may be seen that a value of a magnitude of ΔT may be determined in accordance with various parameters including: a specified temperature control accuracy (±Z), of the regulator 30; a control accuracy (±Y) of the ram-air controller 40; and a control accuracy (±X) of the bleed-air controller 38. An overall maximum temperature range for the regulator 30 may be seen to lie between temperatures represented by lines 200 and 202 of FIG. 3 (i.e. a potential temperature differential of 2*Z). A temperature set point (T), represented by a line 204, may be selected to lie midway between the lines 200 and 202.

A line 206 may represent a lower limit of temperature control of the ram air controller 40 (i.e., a potential temperature of T−Y). A minimum value for the magnitude of ΔT may be selected to be no less than Y+X. A maximum value for the magnitude of ΔT may be selected to be no greater than Z−X. It may be seen that the ram-air door 42 may be controlled responsively to the desired temperature while the bypass valve 34 may be controlled responsively to a temperature set point that is ΔT lower than the desired temperature. This may result in the bypass valve 34 being driven toward its closed position, thereby reducing the amount of the bleed air 22 through the ECS 18. Since ram air usage is primarily to cool the bleed air, and the bleed air may be reduced, the amount of ram air flow required for cooling may also be reduced, hence achieving ram air flow minimization. It should be noted that for reliability reasons, the ram-air door 42 should be allowed to remain at least minimally open. With this minimum open area, the bypass valve 34 may not be fully closed. This may allow the bypass valve 34 to respond quickly to disturbances in temperature of bleed air emerging from the engine 12.

Figure 4:
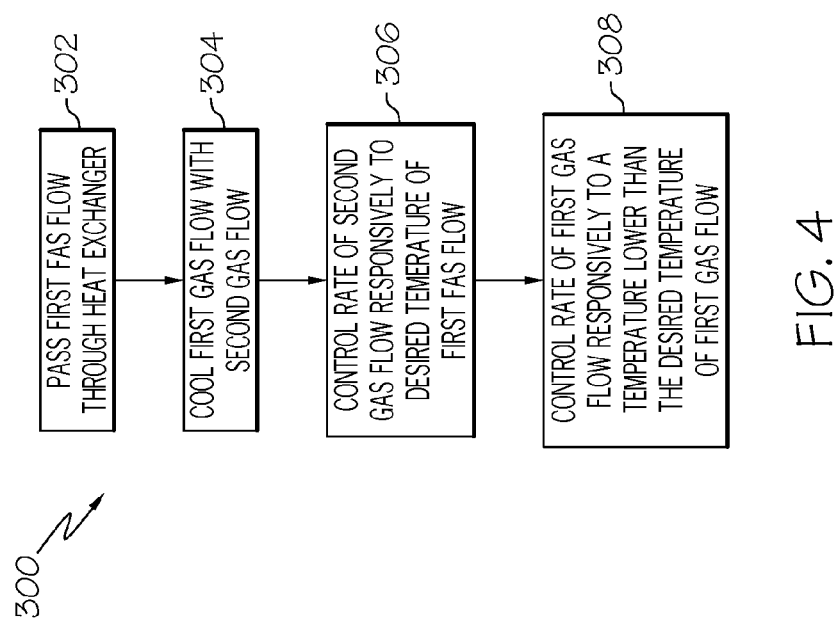
FIG. 4 is a flow chart of a method for controlling temperature of a flow of gas in accordance with an embodiment of the invention.

Referring now to FIG. 4, a flow chart 300 may illustrate an exemplary method which may be employed for regulating temperature of a flow of gas. In a step 302 a first flow of a first gas may be passed through a heat exchanger (e.g., the bleed air 22 may be passed through the heat exchanger 32 of the regulator 30). In a step 304, the first flow of gas with may be cooled with a second flow of a second gas passing over the heat exchanger (e.g., the ram air 24 may be passed over the heat exchanger 32 to cool the bleed air 22 that is passing through the heat exchanger 32). In a step 306, a rate of the second flow of the second gas may be controlled responsively to a desired output temperature of the first flow of the first gas (e.g., the controller 40 may produce operational positioning of the ram-air door 42 responsively to the error signal 53 that is an output of the comparator 52). In a step 308, a rate of the first flow of the first gas may be controlled responsively to an offset temperature lower than the desired output temperature (e.g., the controller 38 may produce an operational positioning of the bypass valve 34 responsively to an error signal 57 that is an output of the comparator 50 and that is a result of a comparison of the offset temperature signal 55 and the temperature signal 48 from the temperature sensor 36).

It should be understood, of course, that the foregoing relates to exemplary embodiments of the invention and that modifications may be made without departing from the spirit and scope of the invention as set forth in the following claims.

We claim:

1. An environmental control systems (ECS) for an aircraft, in which bleed air is cooled with ram air, comprising:
   a ram air controller configured to control a rate of ram air flow responsively to a desired temperature of bleed air at a bleed air outlet;
   a bleed air controller configured to control a rate of bleed air flow responsively to a temperature lower than the desired temperature of the bleed air at the bleed air outlet;
   a temperature sensor positioned at the bleed air outlet;
   a bleed air comparator connected to the bleed air controller and configured to receive an output temperature signal from the temperature sensor; and
   a temperature offset summer connected to the bleed air comparator and configured to:
      receive a desired temperature signal and a temperature offset, and
      provide an offset temperature signal to the bleed air comparator.

2. The ECS of claim 1 further comprising:
   a ram air flow path;
   a heat exchanger positioned in the ram air flow path; and
   a bleed air flow path passing through the heat exchanger to the bleed air outlet.

3. The ECS of claim 2 further comprising:
   a ram-air door positioned in the ram air flow path;
   a bleed air bypass valve;
   the ram air controller operationally connected to the ram-air door; and
   the bleed air controller operationally connected to the bleed air bypass valve.

4. The ECS of claim 1 wherein the offset temperature signal has a magnitude no smaller than Y+X, where Y is a temperature at a lower limit of control accuracy of the ram-air controller and where X is a temperature at a lower limit of a control accuracy of the bleed-air controller.

5. The ECS of claim 1 wherein the offset temperature signal has a magnitude no greater than Z−X where Z is a lower limit of a specified temperature control accuracy of the desired temperature and X is a temperature at a lower limit of a control accuracy of the bleed-air controller.

6. The ECS of claim 1 further comprising a ram air comparator connected to the ram air controller connected to receive an output temperature signal from the temperature sensor.

7. A temperature regulator for a gas flow comprising:
a heat exchanger;
a first flow path for a first gas passing over an exterior of the heat exchanger;
a second flow path for a second gas passing through an interior of the heat exchanger;
a first controller configured to control a rate of flow of the first gas responsively to a desired temperature of the second gas at an outlet for the second gas;
a second controller configured to control a rate of flow of the second gas responsively to a temperature lower than the desired temperature;
a temperature sensor positioned adjacent an output end of the second flow path;
a first comparator connected to:
receive an output temperature signal from the temperature sensor,
receive a desired temperature signal representative of the desired temperature of the second gas at the outlet for the second gas, and
provide a first error signal to the first controller; and
a second comparator connected to receive:
the output temperature signal, and
an offset temperature signal representative of a temperature lower than the desired temperature of the second gas at the output for the second gas,
the second comparator connected to provide a second error signal to the second controller.

8. The temperature regulator of claim 7 further comprising a temperature offset summer connected to receive the desired temperature signal, to receive a temperature offset and to provide the offset temperature signal to the second comparator.

9. The temperature regulator of claim 7 wherein the offset temperature signal is less than the desired temperature signal by an amount that is no less than Y+X, where Y is a temperature at a lower limit of control accuracy of the ram-air controller and where X is a temperature at a lower limit of a control accuracy of the bleed-air controller.

10. The temperature regulator of claim 7 wherein the offset temperature signal is less than the desired temperature signal by an amount that is no greater than Z−X where Z is a lower limit of a specified temperature control accuracy of the regulator and X is a temperature at a lower limit of a control accuracy of the bleed-air controller.

11. The temperature regulator of claim 7 being configured to control temperature of bleed air in an environmental control system (ECS) of an aircraft.

12. The temperature regulator of claim 11 wherein the first gas is ram air and the second gas is bleed air.

13. A method for regulating temperature of a flow of gas comprising the steps of:
passing a first flow of a first gas through a heat exchanger;
cooling the first flow of the first gas with a second flow of a second gas passing over the heat exchanger;
controlling, with a ram-air controller, a rate of the second flow of the second gas responsively to a desired output temperature of the first flow of the first gas;
receiving, by a first comparator, an output temperature signal from a temperature sensor;
receiving, by the first comparator, a desired temperature signal representative of the desired temperature of the second gas;
providing, by the first comparator, a first error signal to a bleed-air controller;
receiving, by a second comparator, the output temperature signal;
receiving, by the second comparator, an offset temperature signal representative of a temperature lower than the desired temperature of the second gas at the output for the second gas;
providing, by the second comparator, a second error signal to the ram-air controller; and
controlling a rate of the first flow of the first gas with the bleed-air controller responsively to the offset temperature signal.

14. The method of claim 13 wherein the offset temperature has a magnitude no smaller than Y+X, where Y is a temperature at a lower limit of control accuracy of the ram-air controller and where X is a temperature at a lower limit of a control accuracy of the bleed-air controller.

15. The method of claim 13 wherein the offset temperature signal has a magnitude no greater than Z−X where Z is a lower limit of a specified temperature control accuracy of the desired temperature and X is a temperature at a lower limit of a control accuracy of the bleed-air controller.

16. The method of claim 13 wherein the first gas is bleed air of an aircraft and the second gas is ram air of an aircraft.

17. The method of claim 16 further comprising the step of regulating an operational position of a bleed air bypass valve to vary a rate of flow of the bleed air.

18. The method of claim 16 further comprising the step of regulating an operational position of a ram-air door to vary a rate of flow of the ram air.

* * * * *